May 3, 1955     W. H. JENKINS     2,707,743
WELDING JIG Filed Aug. 8, 1952     8 Sheets-Sheet 1

Walter H. Jenkins
INVENTOR.

BY
*Attorneys*

May 3, 1955

W. H. JENKINS 2,707,743

WELDING JIG

Filed Aug. 8, 1952

Walter H. Jenkins
INVENTOR.

BY
Attorneys

Fig. 4

May 3, 1955 W. H. JENKINS 2,707,743
WELDING JIG

Filed Aug. 8, 1952 8 Sheets-Sheet 7

Walter H. Jenkins
INVENTOR.

BY
Attorneys

United States Patent Office 2,707,743
Patented May 3, 1955

2,707,743

WELDING JIG

Walter H. Jenkins, Goldsboro, N. C., assignor to Dewey Bros. Inc., Goldsboro, N. C., a corporation of North Carolina Application August 8, 1952, Serial No. 303,390

6 Claims. (Cl. 219—17)

This invention relates to a welding jig and particularly to a jig and method for constructing a horizontal weld on a vertical surface.

Heretofore in the construction of articles requiring a plurality of longitudinal welds between two blanks forming a finished article, it has been customary to put the blanks in assembled position with one of the edges to be welded in top position, weld that edge of the blanks together then turn the blanks over and weld the other edge together. Such method of operation requires a double operation on each blank with a consequent consumption of time in the requirement of the double handling of the blank.

The present invention provides a jig for providing lateral welds on a vertical surface so that both edges of a blank requiring two welds may be welded simultaneously. The object of this invention is accomplished by means of a longitudinally extending frame having rigid top and bottom members preferably conformed or constructed of H-beams spaced apart to provide a pair of welding slots. A roller foundation in the bottom of said frame and auxiliary clamping means for clamping a pair of blanks between the clamping means and the bottom rollers together with side means for clamping the blanks in superimposed position and means within the blank to expand the same against the clamping means.

It is accordingly an object of the invention to provide an improved clamping jig.

It is a further object of the invention to provide a welding jig in which a pair of horizontal welds can be made between vertical surfaces.

It is a further object of the invention to provide a jig in which a pair of blanks may be assembled in proper alignment with each other.

Another object of the invention is to provide a method of constructing horizontal welds on a vertical surface.

Still another object of the invention is to provide a process for welding vertically abutting edges.

Other objects and many of the attendant advantages of the present invention will be apparent from the following detailed description taken in conjunction with the accompanying drawing in which:

Figure 3 is a cross-section through the jig with the parts in clamping position and taken substantially on the plane indicated by the line 3—3 of Figure 2a;

Figures 9 and 9a is an elevation of the mandril;

Figure 11 is a cross section through the mandril taken substantially on the plane indicated by the line 11—11 of Figure 8a;

Figure 12 is a cross section taken substantially on the plane indicated by the line 12—12 of Figure 9a; and Figure 13 is a fragmentary section illustrating the anti-friction foot for the mandril.

Figure 1:
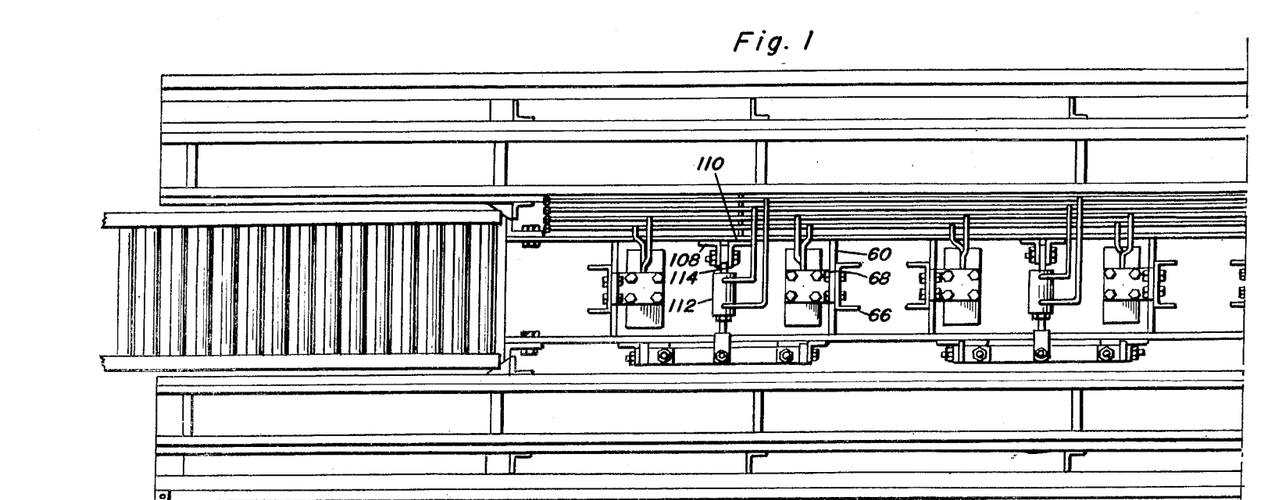
Figures 1 and 1a is a top plan view of the welding jig according to the invention.
Figures 1A, 5:
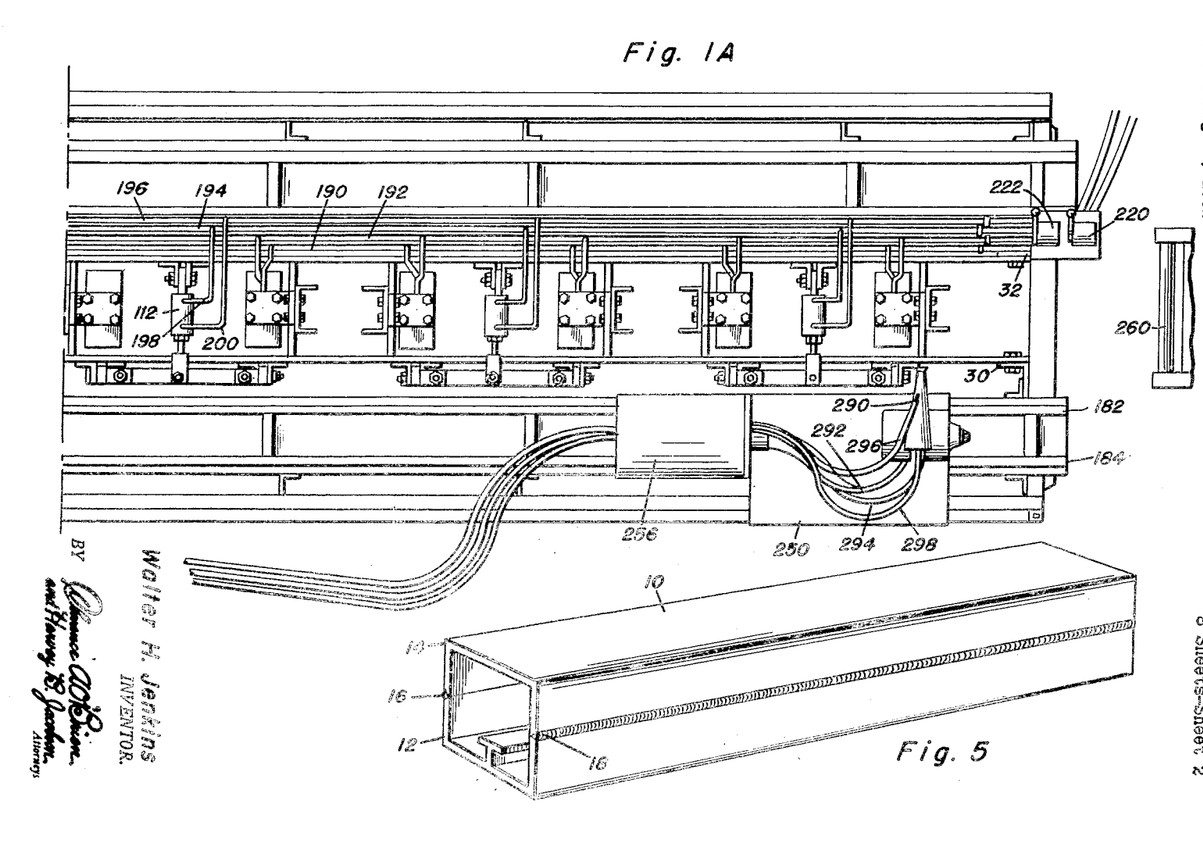
Figure 5 is a perspective view of a welded article produced by the jig and welding machine used therewith.
Figure 2:
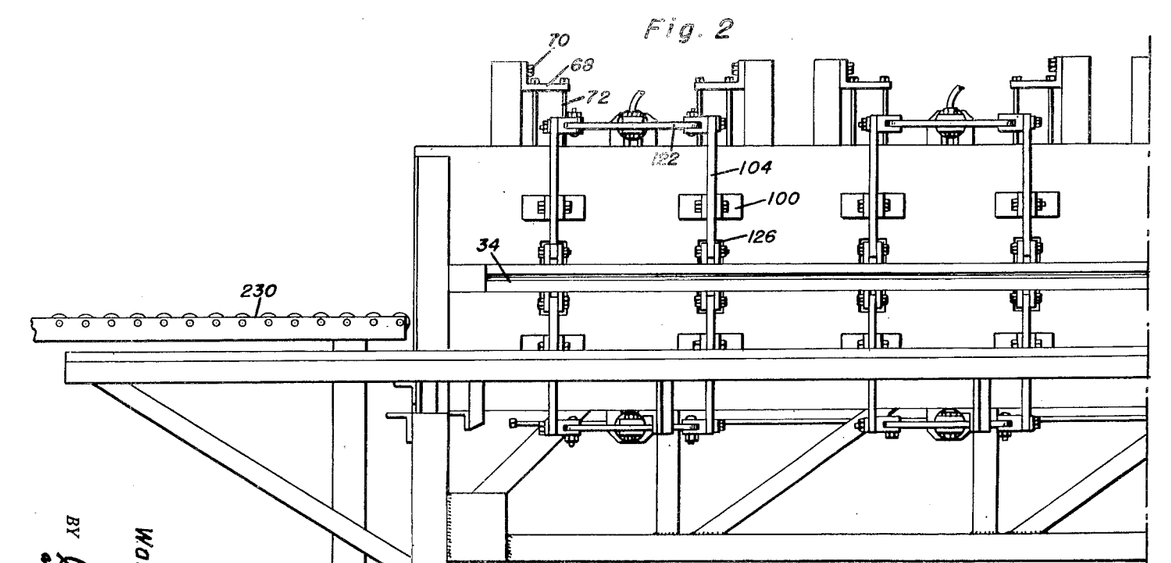
Figure 2 and 2a is a side elevation of the clamping side of the jig.
Figure 2A:
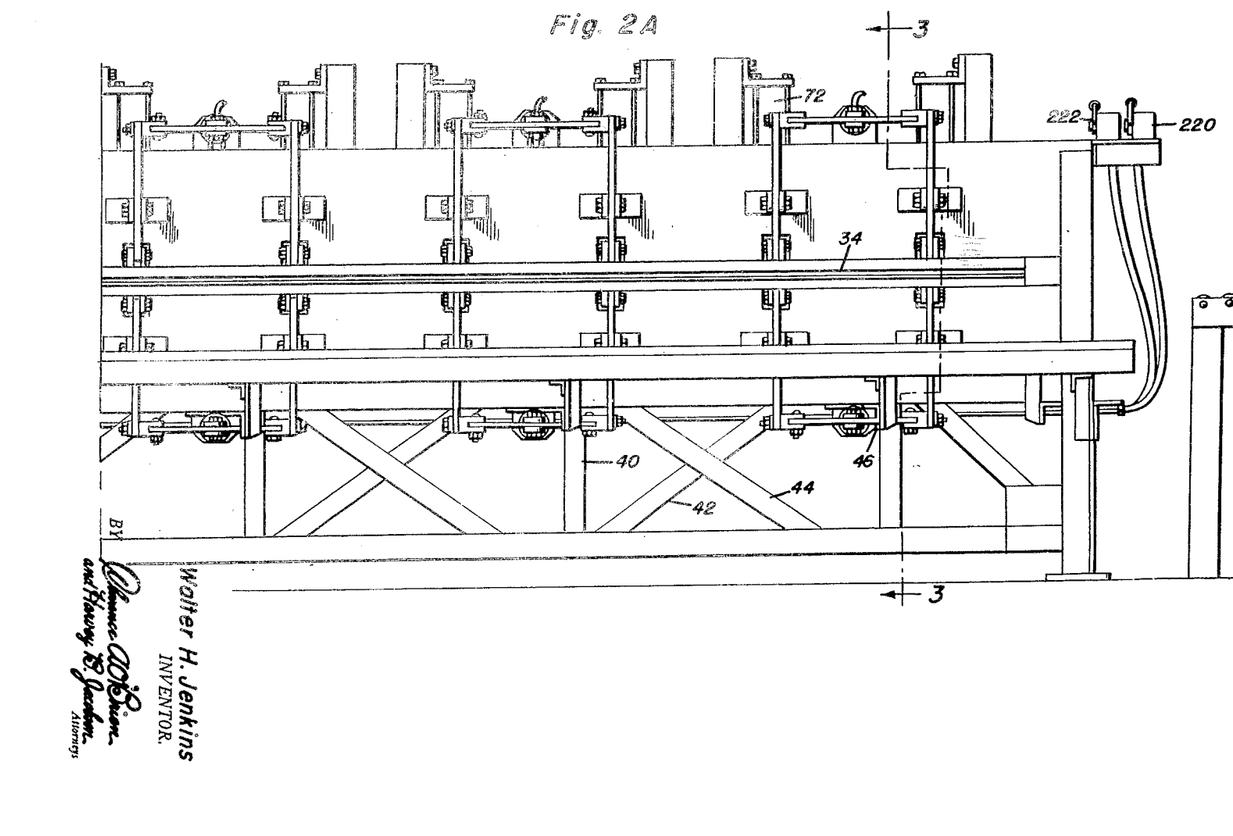

The exemplary embodiment of the invention comprises a jig for forming a bulk out of a bottom blank 12 and a top blank 14, the blanks 12 and 14 being united by horizontal welds 16 and 18. Blanks 12 and 14 being extruded shapes of substantially channel-shape and are arranged in edge-to-edge relation so that the welds 16 and 18 may be simultaneously made between the vertical wall sections.

The jig proper comprises a bottom section 20 constructed of an H-beam and a top section 22 likewise constructed of an H-beam and the H-beams 20 and 22 being separated by vertical corner posts 24 and 26 at one end and posts 30 and 32 at the other end of the frame. Posts 26 to 32 support the H-beams 20 and 22 in parallel spaced relation to provide parallel welding slots 34 and 36. The bottom frame 20 is preferably supported at intermediate points along its length by suitable post members 40 which are preferably rigidified by cross braces 42 and 44. Suitable transverse members 46 extending transversely of the legs 40 and under the beam 20 and extending laterally therefrom for a purpose presently to be described.

Figure 3:
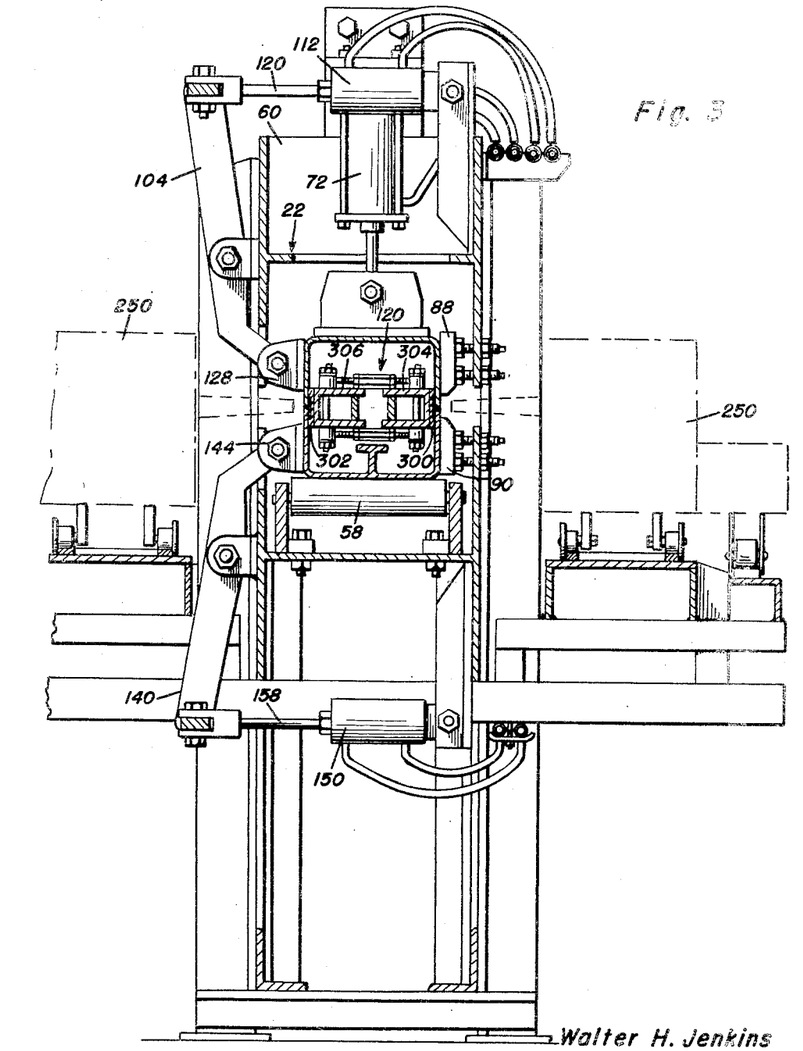
Figure 4:
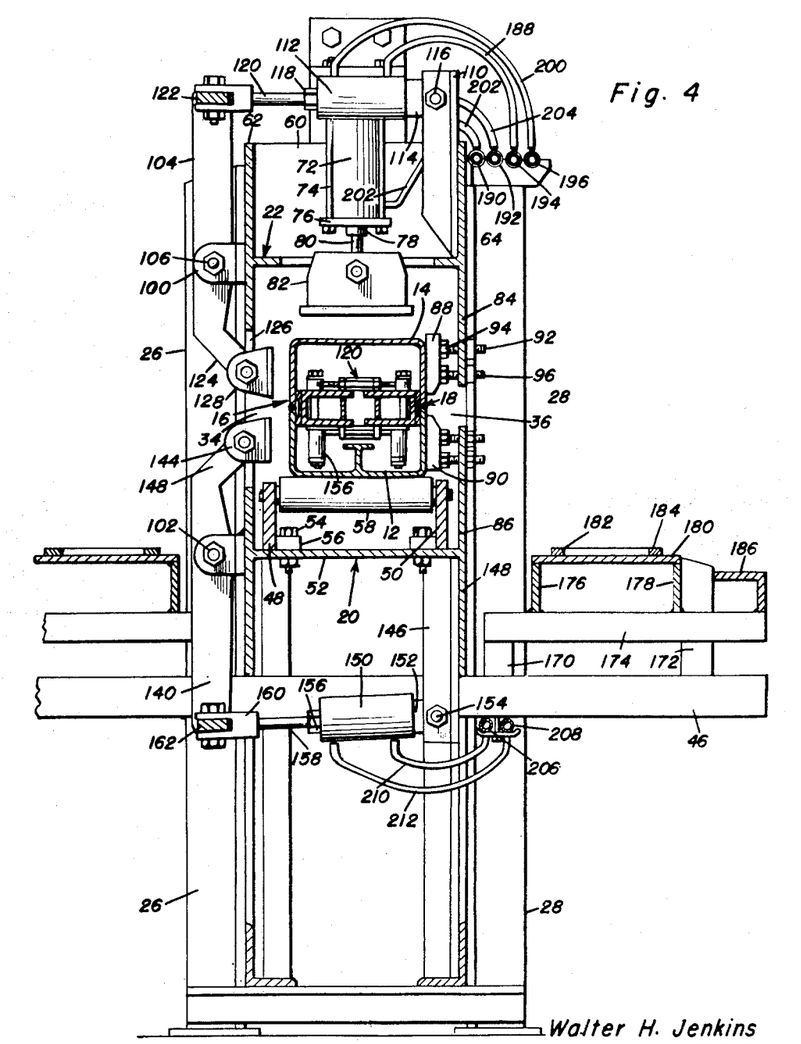
Figure 4 is a similar view showing the jig in open position.
Figure 6:
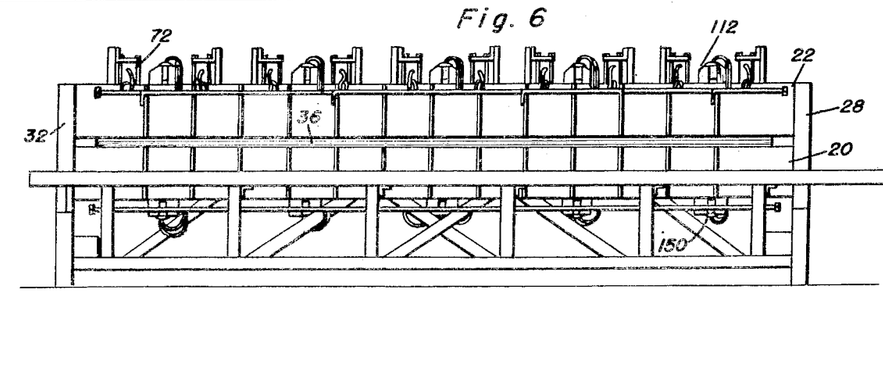
Figure 6 is an elevation of the fixed side of the jig.

The lower frame member or H-beam 20 is provided with a pair of longitudinally extending journal bearings 48 and 50 which are secured to the cross web of the H-beam by means of bolts 54 engaging suitable ears 56 on the journal members. Rollers 58 are arranged in journaled closely spaced relation on the journal members 48 and 50 to provide a bottom floor or support surface in the jig. The top frame member of H-beam 22 is provided with cross bulkheads 60 which are welded between the top flanges 62 and 64 of the H-beam 22. Upstanding channel-shaped brackets 66 are mounted on the cross bulkhead 60, L-shaped bracket 68 are rigidly secured to the channel-shaped bracket 66 by any suitable means such as bolts 70. Fluid pressure cylinder 72 is rigidly supported on the bracket 68 by any suitable means such as the bolts 74. The guide head 76 is placed on the cylinder 72 and has a bearing 78 for the passage of a piston rod 80 which is attached to a piston in the cylinder 72 and has a clamping head 82 pivotally connected thereto. The piston rod 80 being projected from the piston 72 to press the clamping head 82 in the direction of the support surface supplied by the rollers 58. Spaced apart flanges 84 and 86 constituting one side of the jig frame is provided with upper jig blocks and lower jig blocks 90. The jig blocks 88 and 90 being adjustably attached to the flanges 84 and 86 by means of suitable fasteners such as stud bolts 92 having locking nuts 94 and 96 maintaining the studs in rigid relation with respect to the jig blocks and the flanges of the H-beams. The jig blocks 88 and 90 being adjusted to provide a smooth jig surface along one side of the frame or supporting jig and being spaced with relation to the welding slot 36 so that a welding head presently to be described may pass through the slot and operate on a blank pressed against the jig surfaces.

Outstanding ears 100 are mounted on the upper H-beam 22 on the side opposite to the jig blocks and outside of the H-beam and similar ears 102 are similarly mounted on the outside of the lower H-beam 20. Rocker arms 104 are journaled in the ears 100 by means of suitable pivot bolts 106 for oscillatory motion adjacent the face of the H-beam 22. Angle shaped bracket members 108 and 110 are connected in upstanding relation to the inner edge of the flange 64 of the H-beam 22 and a fluid cylinder 112 is pivotally mounted thereto by means of a tongue 114 extending between the L-shaped members 108 and 110 and secured thereto by means of bolts 116. A bearing guide 118 is mounted on the cylinder 112 and a piston rod 120 is projected therefrom and is pivotally connected to a pair of the rocker arm 104 by means of a cross head 122. The lower end of the arm 104 is angularly inclined as at 124 extends through an opening 126 and a clamping shoe 128 is pivotally mounted on the angled end 124 and is adapted on projection of the piston rod 120 to be moved into clamping relation with the blank supported adjacent the jig block 88.

Rocker arms 140 mounted on the ears 102 of the H-beam 20 are provided with angled ends 142 on which are mounted clamping blocks 144. Angle brackets 146 mounted on the flange 148 of the H-beam 20 and extend therebelow and has journaled thereto a fluid piston 150 by means of a tongue 152 secured to the angle members 146 by means of bolts 154. The piston 150 has a guide bearing 156 through which projects a piston rod 158 having a head 160 attached to the cross rod 162 which actuates a pair of the rocker arms 140. The cross members 46 extend laterally from each side of the frame work and has upright extending members 170 and upwardly extending channel shaped members 172 on which is mounted a transverse extending member in the form of an angle member 174. A relatively box-like platform is constructed of a pair of upright members 176 and 178, at least one of these members being rigidly attached to the upright member 172 and also preferably to the cross member 174. The top member 180 being rigidly connected thereto and having a pair of tracks 182 and 184 rigidly mounted thereon by any suitable means such as welding. The platform is given a finished appearance by placing an angle member 186 between the upright 172 and the cross member 174 and welding them thereto. Similar members and tracks are arranged on the alternate side of the frame work.

Figure 7:
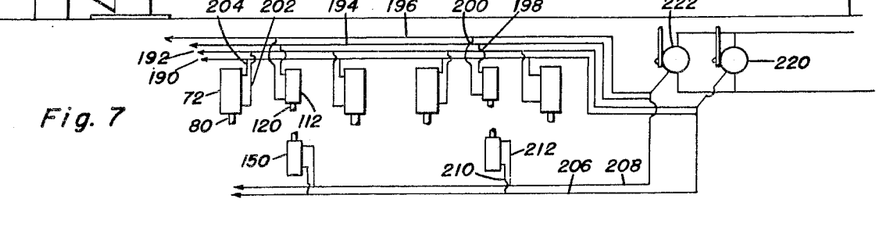
Figure 7 is a schematic control diagram of the fluid control system of the jig.

Fluid is simultaneously distributed to all of the pistons 72 by means of conduits 190 and 192. Likewise, fluid is distributed to the cylinders 112 by conduits 194 and 196. Suitable feeder lines 198 and 200 extending respectively between the conduits 194 and 196 and opposed ends of the cylinder 112. Likewise, jumpers 202 and 204 extend respectively between the conduits 190 and 192 and opposed ends of the cylinder 72. Likewise, conduits 206 and 208 are connected by jumpers 210 and 212 to opposed ends of the piston 150.

The valve 220 simultaneously controls the admission of fluid to each of the cylinders 72 and a valve 222 simultaneously controls admission of fluid to the cylinders 112 and 150. The track 130 is preferably arranged adjacent to the intake end of the jig so that the assembled blanks may be moved therein.

An expanding mandril is placed within the U-shaped blanks and operated to expand the blanks to produce exact alignment between the abutting edges thereof. The mandril includes a pair of back-up plates 300 and 302 having extending U-shaped flanges 304 and 306. The U-shaped flanges 304 and 306 are preferably provided with reinforcing spacer members 308 and 310. The working faces of the back-up plates 300 and 302 are preferably provided with recesses 312 and 314 immediately adjacent to the position where the arc will be struck between the meeting edges of the blanks.

Adjustable toggle members 320 are pivotally connected to the tops and bottoms of the U-shaped members 304 and 306 are operable upon reciprocation of one of the back-up members to cause transverse motion of the members 300 and 302 toward and away from each other. Preferably each of the toggles 320 comprises a pair of eye bolts 322 and 324 being connected together by a long net 326 one end of which is provided with a left-handed thread so that the length between the eyes of the bolts 322 and 324 may be readily adjusted. The eye bolts are connected to the members 304 and 306 by means of transverse bolts 327 provided with castle nuts 328. The actuating members for the mandril comprises a base member including spaced apart arms 330 and 332. A pinion (not shown) is rigidly mounted on a bolt 334 which is secured at the outer ends of the arms 330 and 332 and secured in place by means of a nut 336. A guide sleeve 338 is pivotally mounted on the bolt 334 and receives the pinion which is rigidly connected to the bolt 334 and operated by any suitable means such as a wrench applied to the head of the bolt 334. A rack 340 is slidably engaged in the shield 338 and is provided with teeth 342 to engage the teeth of the pinion within the shield 338. One end of the rack 340 is provided with a bifurcated head 344 which is pivotally connected to the opposite member 304 by means of a pivot bolt 346. Obviously, the members 300 and 302 may be longitudinally moved with respect to each other by actuating the bolt head 334 to operate the rack 340 so that the toggles 320 may be oscillated about the pivot bolts 326 to cause the back-up plates 300 and 302 to advance or recede toward each other.

Figure 8:
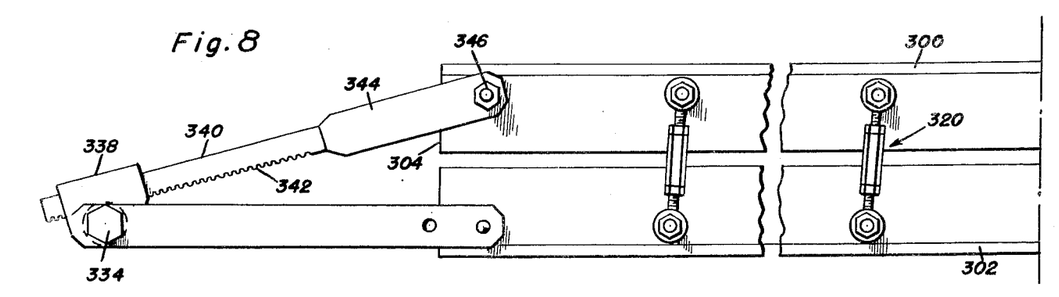
Figures 8 and 8a is a top plan view of an expanding mandril for aligning the abutting blank edges.
Figure 8A:
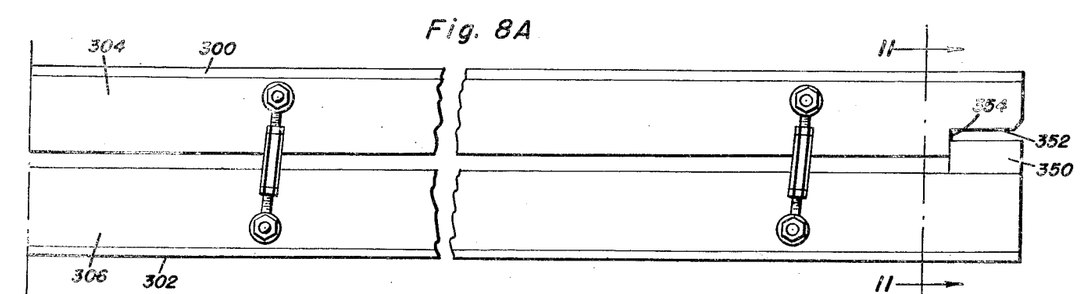
Figure 10:
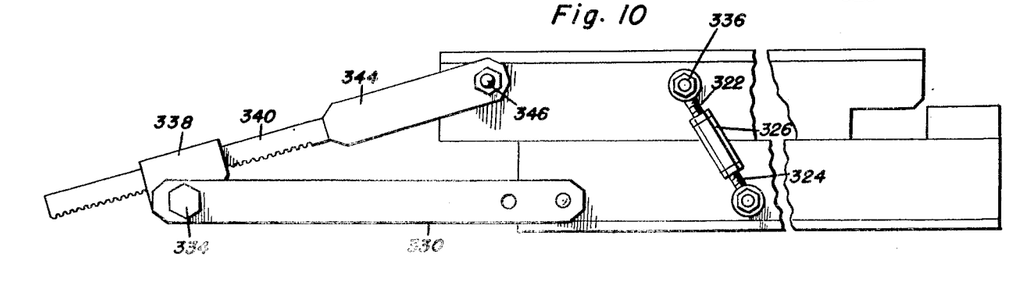
Figure 10 is a view similar to Figure 8 but showing the mandril collapsed.

A control stop 350 is mounted on one of the members such as 306 and a cut-out portion 352 is provided in the alternate portion 304 to provide a shoulder 354 for engagement with the stop block 350 to limit longitudinal motion of the members 300 and 302 in one direction. Preferably the shoulder 354 and the stop block 350 are so arranged that the stop will be just after the toggles 320 have passed over dead-center so that the mandril will be held in fully extended position without exerting any pressure on the pinion within the shield 348.

Figure 9:
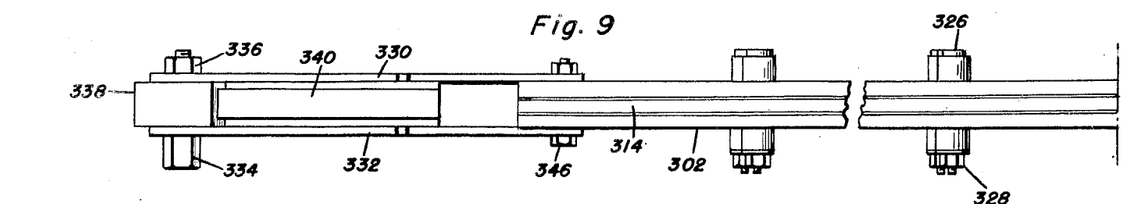
Figures 9A, 11, 12, 13:
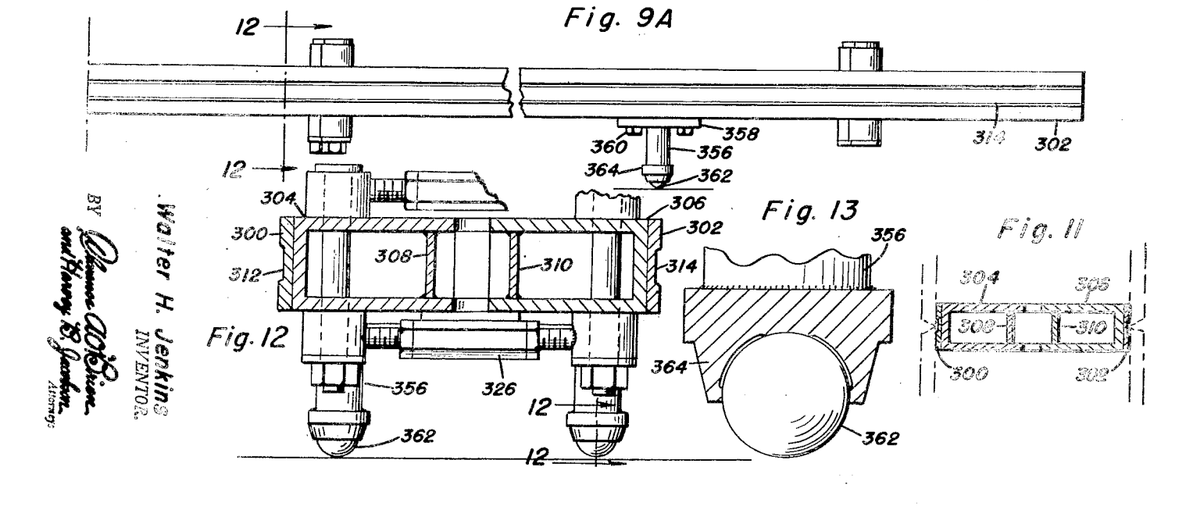

Support members or legs 356 are secured to the members 304 and 306 by any suitable means such as plates 358 which are secured to the members by any suitable means such as cap screws 360, preferably suitable antifriction members such as the balls 362 are provided in a mounting foot 364 so that there is substantially an antifriction bearing between the support or leg member and the interior of the blank members in which the mandril will be placed.

A welding carriage 250 is mounted on each of the track members extending laterally of the frame members and the carriage is traversed along the tracks 182 and 184 by means of a motor 186 by a suitable drive not shown. A welding head 290 is mounted on the carriage 250 and suitable conduits 292 and 294 carry suitable welding atmosphere into the heads 290 while conductors 296 and 298 supply electrical current or welding current to the head.

In the operation of the welding jig according to the invention a pair of blanks 12 and 14 are assembled in proper relation with the mandril members 300 and 302 therein and the expansible member 320 between the members 300 and 302. The assembled blanks are then moved over the roller track 230 onto the rollers 58 which constitute the support platform for the jig after which the cylinders 112 and 150 are actuated to press the blank members 112 and 114 against the members 90 and 88 after which fluid is admitted to the piston 72 to clamp the blank members firmly between the heads 82 and the rollers 58 so that the joint between the members 12 and 14 will be opposite the welding slots 36 and 34. The bolt 334 is then turned to cause longitudinal shifting of the back-up plates 300 and 302 until the shoulder 354 contacts the block 350 so that the mandril will be in expanded position to maintain the edges of the abutting members into strict alignment with each other so that a weld therebetween will be continuous and of the same depth at all portions of the weld.

The carriages 250 are simultaneously started at one end of the welding jig and are moved slowly from end to end of the device preferably being controlled by suitable limit switches not shown. At the initiation of the run the welding head is preferably at a point beyond the ends of the blanks so that the carriage 250 may be in motion and a suitable atmosphere established about the head before the welding rod of the welding head contacts the joint between the blanks 12 and 14 after which the welding will be established and the arc will move from end to end of the assembled blanks providing the necessary weld therebetween. After the carriage has moved the full length of the jig the welding currents will be removed therefrom and the carriages 250 may be returned by any suitable means to the starting point. The original welded blank as shown in Figure 5 will then be discharged from the jig preferably by the introduction of another blank and the welded member will be mounted onto a roller track 260 where the expanding mandril will be withdrawn from the finished blank and reused in the assembly of another pair of blanks.

For simplicity of explanation the device has been explained as being operated on a pair of channel-shaped blanks for making a bulk, but obviously the jig can be utilized to make any sort of device having a horizontal weld between two vertically extending surfaces. Likewise, it is apparent that two semi-circular blanks could be welded together as easily as the two channel shaped blanks as shown.

For purpose of exemplification a particular embodiment of the invention has been shown, and described according to the best present understanding thereof. It will be apparent to those skilled in the art that changes and modifications can be made therein without departing from the true spirit of the invention.

Having described the invention, what is claimed as new is:

1. A welding jig comprising a rigid longitudinal frame of rectangular cross-section, a plurality of closely spaced rigidly mounted rollers journaled in the lower portion of said frame, said rollers defining a straight supporting surface adapted to support a blank in said frame, a longitudinally extending welding slot in the side of said frame, fluid cylinders arranged in perpendicular relation to said supporting surface, pistons projectile from said cylinders toward said surface, a jig surface in said frame, said jig surface being arranged perpendicular to said supporting surface, fluid cylinders mounted transverse of said supporting surface and clamping jaws operatively connected to said transverse cylinders.

2. A welding jig comprising a rigid longitudinal frame of rectangular cross-section, rigidly mounted rollers journaled in the lower portion of said frame, said rollers defining a straight supporting surface adapted to support a blank in said frame, a longitudinally extending welding slot in the side of said frame, fluid cylinders arranged in perpendicular relation to said supporting surface, pistons projectile from said cylinders toward said surface, jig blocks mounted on one side of said frame, said jig blocks defining a jig surface, upper and lower transversely arranged sets of fluid cylinders mounted on said frame, upper and lower walking beams journaled on the side of said frame opposite said jig surface, pistons in said transversely arranged cylinders, the pistons of said upper set of fluid cylinders engaging the upper ends of said upper walking beams, the pistons of said lower set of fluid cylinders engaging the lower ends of said lower set of walking beams, clamping jaws on the lower ends of said upper walking beams and on the upper ends of said lower walking beams and said upper and lower sets of cylinders being operable to clamp a block between said jaws and said jig surface.

3. A welding jig for uniting a pair of channel shaped blanks comprising a rigid frame, a horizontally disposed welding slot in each side of said frame, a plurality of closely spaced rigidly supported horizontally disposed rollers journaled in said frame between and below said slots, said rollers being adapted to support a pair of blanks arranged in superposed edge to edge relation, fluid actuated clamping members operable to clamp a pair of blanks on said rollers with the abutting edges of said blanks presented to said slots, a vertically disposed jig face adjacent one of said slots, fluid actuated clamping means operable to clamp a pair of blanks laterally against said jig face and further fluid actuated clamping means operable to press the edges of said blanks into firmly abutting relation.

4. An expanding mandril for aligning the edges of superposed blanks comprising a pair of back-up plates, support means on said back-up plates, anti-friction rollers on said means, said rollers adapted to engage the inner surface of said one of said blanks, toggle members pivotally connected between said back-up plates, a rack and pinion interconnecting said back-up plates, said rack and pinion being operable to produce relative longitudinal motion between said back-up plates and a stop for limiting the extent of longitudinal motion between said back-up plates.

5. A welding jig comprising an upper and a lower H-beam rigidly mounted in parallel vertically spaced relation, said H-beams including side flanges, said side flanges being in vertical alignment, a plurality of closely spaced rigidly supported rollers journaled in said lower H-beam, said rollers forming a longitudinally extending support surface in said lower H-beam, vertically movable fluid actuated clamping jaws mounted in said upper H-beam and operable for movement toward and away from said supporting surface, parallel chuck blocks rigidly mounted on one set of said side flanges of said upper and lower H-beams, and fluid actuated clamping jaws mounted on the other set of side flanges for movement toward and away from said chuck blocks.

6. A welding jig comprising an upper and a lower H-beam rigidly mounted in parallel vertically spaced relation, said H-beams including side flanges, said side flanges being in vertical alignment, a plurality of closely spaced rigidly supported rollers journaled in said lower H-beam, said rollers forming a longitudinally extending support surface in said lower H-beam, vertically movable fluid actuated clamping jaws mounted in said upper H-beam and operable for movement toward and away from said supporting surface, parallel chuck blocks rigidly mounted on one set of said side flanges of said upper and lower H-beams, fluid actuated clamping jaws mounted on the other set of side flanges for movement toward and away from said chuck blocks, a carriage adjacent each side of said H-beams and a welding hood mounted on each of said carriages, said welding heads being operable through the space between the side flanges of said H-beams.

References Cited in the file of this patent

UNITED STATES PATENTS

| | | |
|---|---|---|
| 1,351,445 | Smith | Aug. 31, 1920 |
| 1,623,434 | Ofner | Apr. 5, 1927 |
| 1,860,172 | Chapman | May 24, 1932 |
| 2,009,884 | Free | July 30, 1935 |
| 2,010,952 | Heineman | Aug. 13, 1935 |
| 2,014,240 | Tarbox | Sept. 10, 1935 |
| 2,061,671 | Reimenschneider | Nov. 24, 1936 |
| 2,623,973 | Malke | Dec. 30, 1952 |